United States Patent [19]

Clark et al.

[11] Patent Number: 4,684,225
[45] Date of Patent: Aug. 4, 1987

[54] CABLE DRIVE FOCUSING MECHANISM FOR OPTICAL INSTRUMENTS

[75] Inventors: James A. Clark, Honeoye Falls; Michael H. Dobner, Webster, both of N.Y.

[73] Assignee: Bausch & Lomb Incorporated, Rochester, N.Y.

[21] Appl. No.: 650,756

[22] Filed: Sep. 14, 1984

[51] Int. Cl.$^4$ ............................................. G02B 21/26
[52] U.S. Cl. ................................................... 350/518
[58] Field of Search ............. 350/518; 74/10.7, 89.22; 16/75, 76

[56] References Cited

U.S. PATENT DOCUMENTS

| | | | |
|---|---|---|---|
| 2,884,788 | 5/1959 | Clark | 74/10.7 |
| 3,194,080 | 7/1965 | Olson | 74/10.7 |
| 4,482,221 | 11/1984 | Clark | 350/530 |
| 4,524,520 | 6/1985 | Levy | 74/89.22 |

FOREIGN PATENT DOCUMENTS 448 of 1898 United Kingdom ..................... 16/76

OTHER PUBLICATIONS

IBM Technical Disclosure Bulletin, vol. 4, No. 9, Feb. 1962.

Primary Examiner—John K. Corbin
Assistant Examiner—Loha Ben
Attorney, Agent, or Firm—John S. Norton

[57] ABSTRACT

An adjusting mechanism for an optical instrument such as a microscope has a plurality of pulleys which are coupled together by a flexible, non-elastic cable. One of the pulleys is fixably rotated to a support member while the other pulleys are rotatably fixed to a movable member. The cable is further coupled to an adjusting shaft. Both ends of the cable are fixed to the support member. Rotation of the adjusting shaft takes up the cable on one side of the pulleys and pays out an exact and equal amount of cable on the opposite side of the pulleys. The pulleys fixed to the movable member are, consequently, moved a proportional amount. The movable member is displaced an exactly equal amount. The adjusting mechanism includes a counter balancing member which is adjustable to counteract the forces exerted upon the movable member.

32 Claims, 6 Drawing Figures

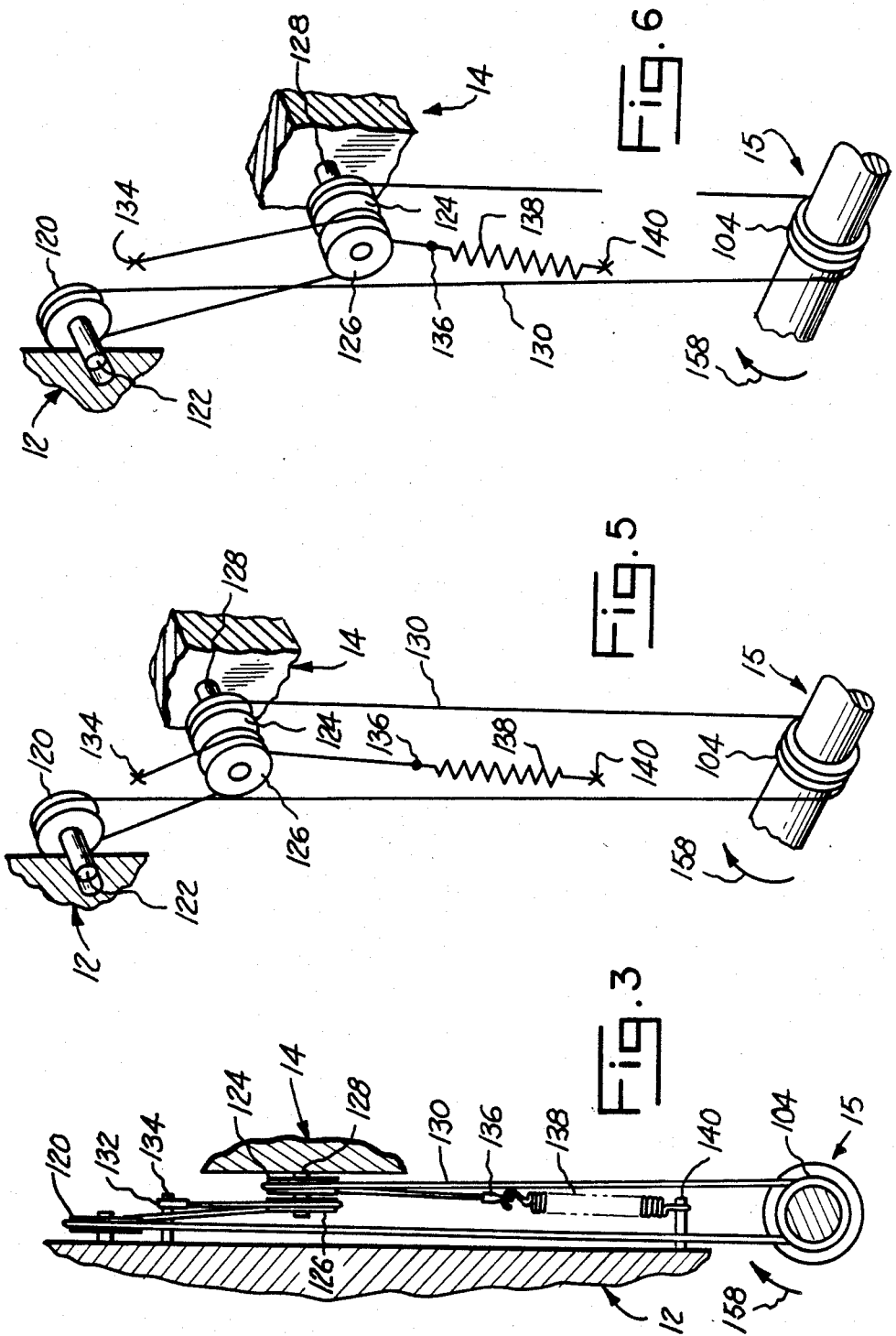

CABLE DRIVE FOCUSING MECHANISM FOR OPTICAL INSTRUMENTS

REFERENCE TO RELATED APPLICATIONS

The present application is related to U.S. Ser. No. 650,927 entitled "Auxiliary Adjusting Mechanism for Optical Instruments", filed Sept. 14, 1984 for inventor James A. Clark and U.S. Ser. No. 650,928 entitled "Apparatus for Adjusting Play in a Precision Optical Instrument", filed Sept. 14, 1984 for Michael Dobner.

BACKGROUND OF THE INVENTION

1. Field of the Invention:

This invention relates to an adjusting mechanism for optical instruments, such as microscopes, and particularly to an adjusting mechanism which incorporates a closed loop cable and pulley drive apparatus for moving one member relative to another. The adjusting mechanism may include a counter balancing device for counteracting the forces exerted on the adjusting mechanism.

2. Description of the Prior Art:

Precision optical instruments, such as microscopes, commonly use a combination of gears, or racks and pinions, or cams and followers, or a combination of these devices to move one member relative to another to gain focus. Some examples of microscopes having coarse and fine adjusting mechanisms for providing adjustment to the nosepiece relative to a fixed stage are illustrated and described in U.S. Pat. Nos. 3,135,817, issued June 2, 1964 to N. A. Wrigglesworth et al and 3,260,157, issued July 12, 1966 to O. W. Boughton. An example of a microscope having a stage adjusting mechanism may be found in U.S. Pat. No. 4,083,256, issued Apr. 11, 1976 to M. Shio. Wrigglesworth shows a cam and follower as does the patent to Boughton. The patent to Shio discloses a rack and pinion arrangement for moving the stage relative to the nosepiece.

In British Pat. No. 629,570, issued Nov. 11, 1949, a microscope adjusting mechanism is shown for displacing the nosepiece relative to the stage. The mechanism is intended to eliminate backlash and loss of motion, both of which have been common problems in the previously described microscope adjusting systems. The mechanism includes two flexible and non-extensible bands of thin metal, such as steel or phosphor bronze, which are connected together at right angles. One end of one of the flat flexible bands is connected to a pivotable member in contact with a nosepiece assembly. The free end of the second flat flexible band is connected to a worm sector. An adjusting shaft has a worm formed thereon which is engaged to the worm sector. Rotation of the adjusting mechanism in one direction exerts a pull on the flexible band members, causing the pivotable member to rotate and exerting an upward force on the nosepiece assembly, thereby moving the nosepiece away from the stage. A pair of springs are incorporated, one of which forces the nosepiece assembly in a downward manner. The other spring is of substantially stronger construction and pushes against the pivotable member to subject the flexible bands to a positive tensioning force.

In German Pat. No. 1,208,591, published Jan. 5, 1966, a mechanism is shown for counter-balancing an instrument part which is vertically movable along a track supported on a housing. In this mechanism, a spring is fixed at one end in the housing while its other end is coupled by a drive belt wrapped around a cam mounted cylinder drum to an idler pulley and then to the movable part. The tension of the spring may be altered by rotating the cam mounted cylinder drum. An overriding clutch is incorporated to prevent free running in the opposite direction.

In German Pat. No. 750,446, issued Dec. 21, 1944, an apparatus is shown for setting up observation microscopes for machine tools. In this apparatus, the microscope is not connected directly to the machine tool but, preferably is suspended from an overhead pendant cord hoist.

Examples of various other adjusting systems may be found in U.S. Pat. Nos. 3,019,707, 3,683,704, 3,768,885, 4,020,705 and 4,173,902.

The above described adjusting mechanisms suffer from a variety of problems, which may include numerous and sometimes expensive parts and which may require skilled technicians to assemble and adjust.

As will be detailed hereinafter, the adjusting mechanism of the present invention provides a solution to the problems set forth above. The mechanism incorporates a closed loop cable and pulley drive system which, where necessary, may be adjusted to counter balance various weights and forces exerted upon it. The closed loop drive system is economical to manufacture, easy to assemble and accurate within very tight tolerances. Additionally, the drive system of the present invention may be easily adapted to move either the stage or the head assembly, or for other applications.

SUMMARY OF THE INVENTION

An adjusting mechanism for optical instruments such as microscopes, includes a closed loop drive mechanism for moving one member relative to another member. The closed loop drive system includes an adjusting shaft supported by a fixed member and a plurality of pulleys over which a nonelastic flexible cable is mounted. Two pulleys are mounted to one of the members while one pulley is mounted to the other member. The cable is wrapped around the pulleys and adjusting shaft and secured to one member such that rotation of the adjusting shaft imparts a corresponding and proportional movement to the other member relative to the one member.

The adjusting mechanism may include a counter balancing mechanism which is easily adjusted to compensate for additional forces exerted upon the ajusting mechanism.

BRIEF DESCRIPTION OF THE DRAWINGS

FIG. 3 is a partial section taken along line 3—3 of FIG. 1;

FIGS. 5 and 6 are schematic diagrams of the closed loop adjusting mechanism.

DETAILED DESCRIPTION OF THE PREFERRED EMBODIMENT

Figure 1:
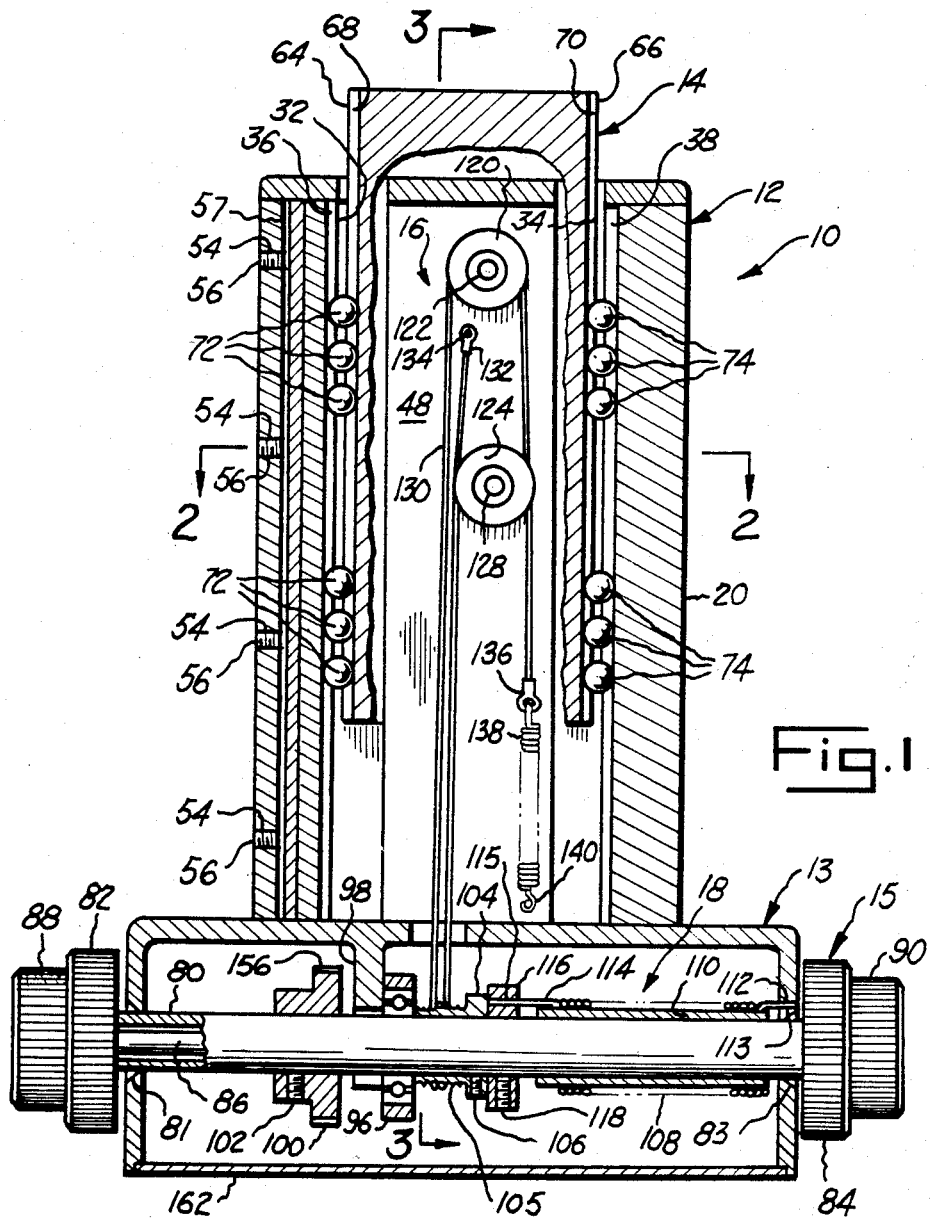
FIG. 1 is a partially sectioned front view of an optical instrument incorporating the adjusting mechanism of the present invention.

An optical instrument 10, such as a microscope, is shown in FIG. 1 and comprises a support column 12, a slide member 14 mounted to the column for low friction movement, a closed loop drive system 16 for moving the slide member 14 with respect to the column 12, and a spring biasing member 18 for applying torque to the drive system to offset the weight of the slidable member 14 and any devices mounted thereto, such as a microscope stage or head. The column 12 is fixed to base 13 which supports a coarse/fine adjusting mechanism 15 and an auxiliary adjusting mechanism 17.

Figure 2:
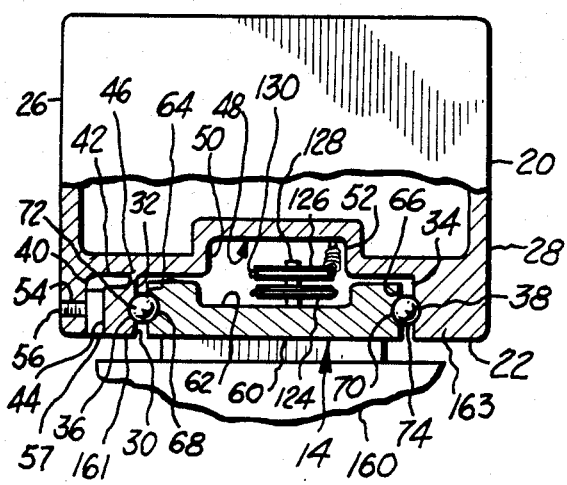
FIG. 2 is a sectional view taken along line 2—2 of FIG. 1.

As best seen in FIGS. 1 and 2, support column 12 comprises an elongated generally boxed shaped member 20, having front 22, rear 24 and side walls 26 and 28. Front wall 22 includes a vertical recess 30 which is defined by a pair of opposing sides 32 and 34. A ball race 36 is formed in side 32 while a corresponding ball race 38 is formed in side 34. Wall 22 includes a second vertical recess 48 having sides 50 and 52 which are substantially parallel to sides 32 and 34.

Front wall 22 includes an L-shaped slot 40 formed between wall 26 and side 32. As is best seen in FIG. 2, foot 42 of slot 40 extends from leg 44 toward side 32. A relatively thin section 46 of material remains between foot 42, side 32 and hinged portion 161. A plurality of threaded apertures 54 are formed in side 26, as best seen in FIG. 1, and receive adjusting screws 56.

Slide member 14 comprises front 60, rear 62 and sides 64 and 66, rspectively. A ball raceway 68 is formed in side 64. A complimenting ball raceway 70 is formed in side 66. The slide member 14 is mounted to column 12 via ball bearings, such as is illustrated by 72 and 74 in FIGS. 1 and 2.

By referring to FIG. 1, it will be seen that support column 12 is mounted in any appropriate way (not shown) to base 13 which contains the coarse and fine adjusting mechanism 15 such as disclosed and claimed in assignee's U.S. Ser. No. 450,901, filed Dec. 21, 1982 now U.S. Pat. No. 4,437,448. Briefly, the mechanism 15 comprises a coarse focus shaft 80 which is rotatably mounted in base 13 by bearings 81, 83 and 96. A pair of adjusting knobs 82 and 84 are mounted at opposite ends of the coarse adjusting shaft. A fine adjusting shaft 86 is coaxially mounted within coarse shaft 80 and includes a pair of oppositely mounted adjusting knobs 88 and 90 respectively. The bearing member 96 is supported on boss 98. For purposes described later, shaft 80 also supports pulley 100, cable wrap reel 104 and spring biasing member 18. Pulley 100 is fixed via set screw 102 to shaft 80 between bearing 81 and boss 98. A cable wrap 104 is fixed to the coarse shaft 80, adjacent bearing 96, by set screw 106. The cable wrap reel includes a spiral groove 105.

The spring biasing member 18 comprises a torsion spring 108 which is fitted about a sleeve member 110 which is itself fixed over coarse shaft 80. As shown in FIG. 1, end 112 of torsion spring 108 is fixed to, for example, aperture 113 of base 13. The other end 114 is fixed to aperture 115 of collar 116 which, as explained below, is fixed via set screw 118 to coarse shaft 80 adjacent cable wrap reel 104.

As illustrated in FIGS. 1 and 3 and schematically in FIGS. 5 and 6, the closed loop drive system 16 includes a first pulley 120 rotatably mounted to shaft 122 which is received in recess 48 of column 12. Second and third pulleys 124 and 126 are rotatably supported by shaft 128 on side 62 of slide member 14. A non-elastic, flexible drive cable 130 couples the first, second and third pulleys together with the coarse/fine adjusting mechanism 15. One end 132 of the cable 130 is fixed to post 134 which, in turn, is fixed to and extends from column recess 48. As best seen in FIGS. 5 and 6, the cable 130 extends from post 134 down and approximately 180 degrees around slide member pulley 126 and back up around column pulley 120. Cable 130 wraps approximately 180° around pulley 120 extending down to engage and wrap several times around the spiral wrap reel 104 which, as mentioned previously, is mounted to coarse/fine adjusting mechanism 15. The cable 130 extends from wrap reel 104 upwardly to engage and wrap approximately 180° around pulley 124, and then down to where end 136 is fixed to coil spring 138. The spring 138 is in turn mounted to post 140 which is fixed to column 12 and provides a positive tensioning force to cable 130 ensuring that it remains taut.

Figure 4:
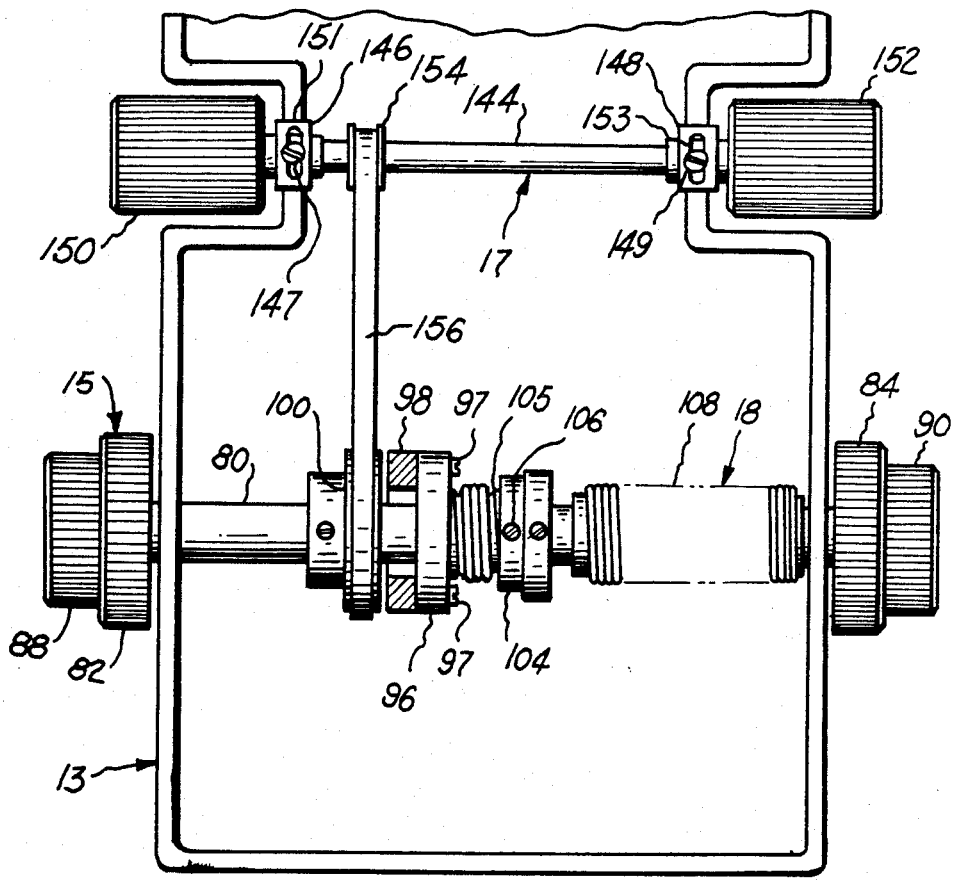
FIG. 4 is a bottom plan view of the instrument of FIG. 1 having the cover plate removed.

An auxiliary adjusting mechanism 17, best illustrated in FIG. 4, is mounted to base 13 adjacent coarse/fine adjusting mechanism 15. Mechanism 17 comprises shaft 144 which is rotatably mounted to base 13 by adjustable bearing and retainer assemblies 146 and 148. Suitable knobs 150 and 152 are mounted at opposite ends of shaft 144. A pulley 154 is mounted to shaft 144 so as to be in approximate alignment with pulley 100 mounted to coarse/fine adjusting mechanism 15. A pulley belt 156 couples pulleys 100 and 154 together. Belt 156 is preferably toothed as are pulleys 100 and 154.

In operation, the operator may grasp and rotate any appropriate adjusting knob (82, 84, 88 or 90) to rotate shaft 80 which in turn wraps cable 130 about cable wrap reel 104. However, it is evident from viewing the drawings and from the foregoing description, that cable 130 is fixed at 132 and end 136 via spring 138, to support column 12 to form a closed loop. Therefore, since it is not possible to alter the length of cable 130, rotation of shaft 80 merely takes up a certain amount of cable 130 on one side of reel 104 and plays out the exact amount on the other side thereof. For instance, by viewing FIGS. 5 and 6, it will be seen that by rotating coarse/fine adjusting mechanism 15 in a clockwise direction, as indicated by arrow 158, cable 130 and pulleys 124 and 126 are pulled downward. Cable 130 is also pulled upward on the left hand side, over pulley 120, by the downward movement of pulley 126. Because the cable forms a closed loop system, as previously described, and because pulleys 124 and 126 are fixed to the slide member 14, rotation in a clockwise manner moves slide member 14 in a downward manner. Obviously, by rotating in a counter-clockwise manner the downward pull on the cable, between reel 104 and pulley 120 exerts an upward pull on pulley 126 and, hence, slide member 14.

Member 14 has been designed so that various assemblies may be selectively mounted or dismounted from it. For example, a stage 160, such as partially shown in FIG. 2, may be mounted to the slide member 14. Or, depending on the application, a head assembly containing appropriate optics may be mounted. In order to compensate for the differences in weight between the assemblies, spring biasing member 18 is provided which allows for simple and easily accomplished adjustments. With this design, slide 14, and the assembly supported thereon, such as stage assembly 160, can be statically balanced at approximately midway in the travel of the slide member 14. This is accomplished by adjusting the torque applied to the adjusting mechanism 15 by the spring biasing member 18.

By interchanging that stage assembly 160 for another which is perhaps heavier or lighter, it is preferable to rebalance the system. To accomplish this, an operator would gain access to the bottom of the instrument 10 through removable cover 162 of base 13 so that screw 106 of cable wrap reel 104 may be loosened. The operator would then hold wrap reel 104, now uncoupled from shaft 80, in a relatively fixed position with one hand, while with the other hand, rotating either of the coarse adjusting knobs 82, 84. Depending on the direction of rotation of shaft 80, spring 108 is either tightened or loosened. Therefore, by rotating shaft 80 in either direction, the torque which spring 108 exerts on shaft 80 is either increased or decreased a corresponding amount. Obviously, by increasing the weight supported by the slide member 14, it becomes necessary to increase the torque delivered by spring 108. The operator would, therefore, tighten the spring an appropriate amount. After adjusting the torque, set screw 106 could then be locked down on coarse shaft 80 to restore static balance to the system.

The auxiliary focusing mechanism 17 has been provided to afford the operator an alternative location for initiating focusing. As adjusting mechanism 15 is closer to the rear of the instrument 10 it is, for some people, awkward to reach. Mechanism 17 is positioned closer to the front of the instrument 10 and, thus may be more convenient to grasp and rotate either knob 150 or 152. By rotating shaft 144, belt 156 is likewise rotated and, in turn, rotates pulley 100 and coarse/fine adjusting mechanism 15.

As the belt 156 is designed to be tautly positioned between pulley 100 and pulley 154, some distortion of the coarse/fine adjusting mechanism 15 may normally occur. However, bearing 96 which is journalled about coarse shaft 80 of mechanism 15 is provided to prevent such distortions. Once coarse/fine adjusting mechanism 15 has been preliminarily positioned in base 13, the bearing 96 is secured by screws 97 to boss 98, as best illustrated in FIG. 4. The auxiliary adjusting mechanism 17 is then positioned by loosening screws 147 and 149 which are fitted to slotted apertures 151 and 153 of bearing retainers 146 and 148 respectively. The auxiliary adjusting mechanism 17 is moved to tighten belt 156 on pulleys 100 and 154 thereby exerting the appropriate amount of tension. When mechanism 17 is properly positioned screws, 147 and 149 are locked down on bearing retainers 146 and 148.

By referring to FIG. 2, it will be seen that thin section 46 adjacent L-shaped slot 40 may be made to act similar to a hinge by manipulating adjusting screws 56. For instance, should there be too much play between slide member 14 and column 20, screws 56 would be tightened to bar against a member 57 situated in leg 44 of slot 40, which in turn bears against the hinged portion 161 of the column having ball raceway 36 formed therein. By tightening screws 56, thin section 46 is caused to flex thereby acting as a hinge pivoting portion 161 toward slide member 14. The opposite side of slide member 14 is rigidly supported by ball bearing 74 and a sturdy unflexible portion 163 of column 12. Accordingly, the fit between the ball raceways and the ball bearings may be adjusted to remove some or all of the play. Obviously, in order to increase the play in the system, it is necessary to loosen screws 56 to release some of the pressure which they exert against hinge portion 161 of column 12. The plate 57 is manufactured of an appropriate material to ensure that screws 56 exert a relatively uniform force against the hinged portion 161 of the column 12. Plate 57 also prevents the screws 56 from digging into and distorting the hinged portion 161 of the column 12.

It should be understood that although only a certain embodiment of this invention has been shown and described in detail that there are other embodiments and modifications which could be made to the present invention without departing from the spirit or scope of the invention as set forth and defined in the appended claims.

It is claimed:

1. In a microscope having a stationary member and a member slidably mounted thereto for supporting thereon either a stage assembly or an optical head assembly, apparatus for moving said stage assembly or said optical head assembly relative to the stationary member, comprising:
   (a) a stationary first member;
   (b) a movable second member mounted to said stationary first member for movement parallel to said first member;
   (c) a shaft rotatably supported by said stationary first member;
   (d) first means secured to said first member;
   (e) second means secured to said second member; and
   (f) drive means having opposite ends mounted to said first member, said drive means forming a closed loop which couples together said first means, said second means and said rotatable shaft whereby rotation of said rotatable shaft causes said drive means to move said second member parallel to said first member.

2. The apparatus as set forth in claim 1, wherein said drive means comprises a cable.

3. The apparatus as set forth in either claim 1 or claim 2, wherein said first and second means are pulleys which are rotatably secured to said first and second members.

4. The apparatus as set forth in claim 2, wherein said cable is non-elastic.

5. The apparatus as set forth in claim 4, wherein an elastic member is fixed between one end of said cable and said first member.

6. The apparatus as set forth in claim 5, wherein said elastic member is a coil spring.

7. The apparatus as set forth in claim 3, wherein said second means comprises two pulleys.

8. The apparatus as set forth in claim 7, wherein said two pulleys are mounted to a common shaft.

9. The apparatus as set forth in claim 7, wherein said cable is fixed at one end to said first member and extends therefrom to wrap partially around one pulley of said two pulleys, around said shaft, partially around said pulley mounted to said first member, partially around the other of said two pulleys and to a mounting point on said first member.

10. The apparatus as set forth in claim 9, wherein said cable is wrapped about a spiral wrap reel mounted to said adjusting shaft.

11. The apparatus as set forth in claim 5, wherein said cable is wrapped at least several times around said adjusting shaft.

12. The apparatus as set forth in claim 11, wherein said adjusting shaft includes a spiral wrap reel upon which said cable is wrapped.

13. In a microscope having an adjusting shaft for moving a first member relative to a fixed second member, apparatus for applying torque to the adjusting shaft, comprising:

a support member;

a shaft rotatably supported by said support member;

a resilient member mounted for cooperation with said rotatable shaft, said resilient member having one of its ends mounted to said support member and its other end mounted to said rotatable shaft for applying torque.

14. The apparatus as set forth in claim 13, wherein said resilient member comprises a helical torsion spring having one of its ends fixed to said shaft and its other end fixed to said support member.

15. The apparatus as set forth in claim 14, wherein said torsion spring is fitted about said shaft.

16. The apparatus as set forth in either claim 14 or claim 15, and further including means for selectively adjusting the torque applied to said shaft by said torsion spring.

17. The apparatus as set forth in claim 16, wherein said torque adjusting means comprises a member coupling said shaft to said torsion spring, said coupling member being rotatable relative to said shaft to permit adjustment of the torque being exerted on said shaft by said torsion spring.

18. The apparatus as set forth in claim 17, further including means, coupled to said shaft, for moving a member relative to said support, said member adapted to support one or more apparatus, said movable member and apparatus exerting a torque on said shaft counter to the torque exerted by said torsion spring.

19. In a microscope having a stationary member and a member slidably mounted thereto for supporting thereon either a stage assembly or an optical head assembly, apparatus for moving said stage assembly or said optical head assembly relative to the stationary member, comprising:
  (a) a first member;
  (b) a second member mounted to said first member for movement relative thereto;
  (c) a shaft rotatably supported by said first member;
  (d) first means rotatably fixed to said first member;
  (e) second means rotatably fixed to said second member;
  (f) drive means having opposite ends mounted to said first member, said drive means forming a closed loop which couples together said first means, said second means and said shaft whereby rotation of said shaft causes said drive means to move said second member relative to said first member; and
  (g) means cooperative with said shaft and said support member for applying torque to said shaft.

20. The apparatus as set forth in claim 19, wherein said drive means comprises a cable.

21. The apparatus as set forth in claim 20, wherein said first and second means are pulleys.

22. The apparatus as set forth in claim 20, wherein said cable is non-elastic.

23. The apparatus as set forth in claim 22, wherein an elastic member is fixed between one end of said cable and said first member.

24. The apparatus as set forth in claim 21, wherein said second means comprises two pulleys.

25. The apparatus as set forth in claim 21, wherein said two pulleys are mounted to a common shaft.

26. The apparatus as set forth in claim 25, wherein said cable is fixed at one end to said first member and extends therefrom to wrap partially around one of said two pulleys, around said shaft, partially around said pulley mounted to said first member, partially around the other of said two pulleys to a mounting point on said first member.

27. The apparatus as set forth in claim 26 wherein said cable is wrapped at least several times around said adjusting shaft.

28. The apparatus as set forth in claim 27, wherein said adjusting shaft includes a spiral wrap reel upon which said cable is wrapped.

29. The apparatus as set forth in either of claim 21 or claim 25, wherein said torque applying means comprises a resilient member mounted to said first member and said adjusting shaft.

30. The apparatus as set forth in claim 21, wherein said resilient member comprises a helical torsion spring.

31. The apparatus a set forth in claim 30, wherein said helical torsion spring is mounted about said shaft.

32. The apparatus as set forth in claim 30, wherein said torque applying means includes means for selectively engaging or disengaging said spring from said shaft whereby said helical torsion spring may be adjusted to alter the torque applied to said shaft.

* * * * *